Jan. 1, 1963  N. SABA  3,070,904
QUESTION AND ANSWER GAME
Filed July 25, 1961

INVENTOR.
NICHOLAS SABA
BY
Gardner + Zimmerman
ATTORNEYS

United States Patent Office 3,070,904
Patented Jan. 1, 1963

3,070,904
QUESTION AND ANSWER GAME
Nicholas Saba, Castro Valley, Calif., assignor of one-half to Charles M. Kinsey, Oakland, Calif.
Filed July 25, 1961, Ser. No. 126,566
5 Claims. (Cl. 35—9)

This invention relates generally to instructional devices or educational games and is more particularly directed towards a game wherein a series of questions and answers are simultaneously exhibited and the player must indicate the correct answers to each of the various questions.

It is a primary object of the present invention to provide a novel and improved game of the character described having two electric lights, one of which glows to indicate that the proper answer has been selected and the other of which glows to indicate that the selected answer is wrong.

It is another object of the invention to provide a question and answer game having a visual indicator circuit which does not employ any electrical relays or the like.

It is a further object of the invention to provide a game of the character described having an electrical indicator circuit whose only active and passive elements include a voltage supply and two incandescent bulbs.

Still another object of the invention is to provide a question and answer game having interchangeable sets of questions and answers.

An even further object of the invention is to provide a game having interchangeable sets of questions and answers wherein the positions of the corresponding questions and answers may be varied with relation to the game board to prevent the player from correlating the various positions instead of seeking the correct answer.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings.

Figure 1:
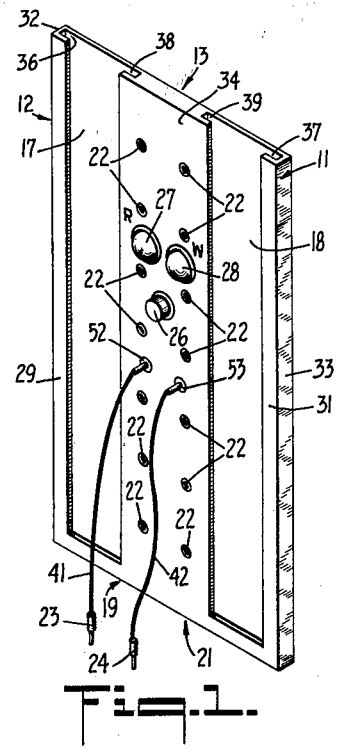
FIGURE 1 is a perspective view showing the front side of the game board of the instant invention.
Figure 2:
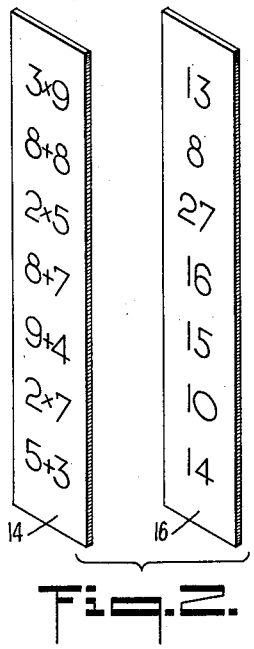
FIGURE 2 illustrates a typical set of question and answer cards which can be inserted into spaces provided on the board shown in FIGURE 1.

For a description of the invention in broad terms, reference is now made to FIGURES 1 and 2 wherein is shown a generally rectangular game board 11 having a front side 12 and a rear side 13. The front side 12 is adapted to exhibit interchangeable question and answer cards 14 and 16 in the respective elongated spaces 17 and 18, there being further provided two longitudinal columns 19 and 21 of electrical sockets 22, each being disposed respectively adjacent one of the individual questions and answers. A plug 23 is inserted into one of the sockets in column 19 to select a question, and the answer is chosen by inserting another plug 24 into one of the sockets in column 21. After both plugs are inserted, the player depresses a button 26 whereupon a light 27 designated by an "R" will glow if the answer is correct and a light 28 designated by a "W" will glow if the answer selected is wrong.

Noting now the details of the game board 11, the front side 12 is seen to include a pair of elongated ridges 29 and 31 disposed respectively adjacent the longer board edges 32 and 33. A central ridge 34 is then positioned intermediate the ridges 29 and 31 to define the aforementioned elongated spaces 17 and 18. By adapting the ridges and central panel respectively with longitudinal grooves 36, 37, 38 and 39, the question and answer cards 14 and 16 may be readily inserted into and removed from the spaces 17 and 18 thereby adapting the game board for interchangeable sets of questions and answers. The plugs 23 and 24 are then secured to the central panel 34 by means of connecting wires 41 and 42.

Figure 3:
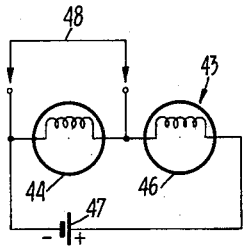
FIGURE 3 is a schematic diagram of the visual indicator portion of the electrical circuit of the instant invention.

As regards the fundamental visual indicator circuit of the invention, reference is now made to FIGURE 3 wherein is shown an indicator circuit 43 having two incandescent bulbs 44 and 46 coupled in series with a voltage supply 47. As an important feature of the invention, the bulb 44 has a substantially larger resistance than the bulb 46 whereby the greater proportion of the circuit voltage drop is across the bulb 44. By selecting the proper bulb resistances in conjunction with the voltage supply, the bulb 44 is sufficiently energized to glow, but the power dissipated in the bulb 46 is not enough to light it. Hence, with both the bulbs 44 and 46 in the circuit, only the bulb 44 will glow. Now, by short circuiting the bulb 44 by means of a wire 48 or the like, the full supply voltage is placed across the bulb 46 causing it to glow, and the bulb 44 will not glow for lack of any power through it. Thus when the supply 47 is on, either the bulb 44 or the bulb 46 glows, depending on whether the bulb 44 is short circuited or not.

As an example of a practical embodiment of the foregoing circuit, consider the following component values: bulb 44 having a resistance of about 9 ohms; bulb 46 having a resistance of about 6 ohms; and supply 47—1.5 volts D.C. When the bulb 44 is not shorted out, 0.1 amp. flow through the circuit, which is sufficient to light bulb 44 but not bulb 46. By shorting bulb 44, 0.25 amp. flow through bulb 46 thereby lighting it.

Figure 4:
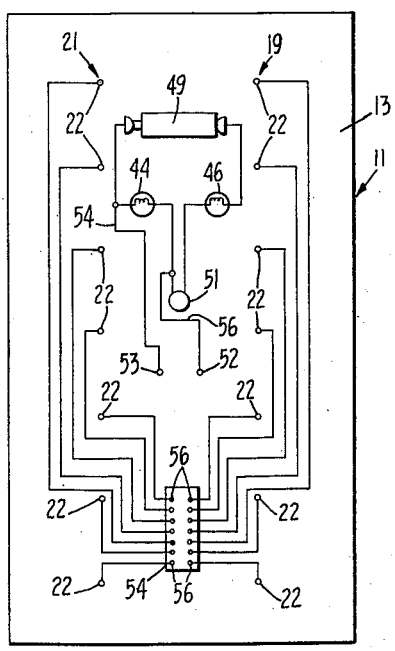
FIGURE 4 is a view of the rear side of the game board shown in FIGURE 1, and illustrates the electrical wiring mounted on the boards.

Looking now at FIGURE 4, it is seen how the circuit 43 is employed in the instant question and answer game. The bulb 44 is oriented on the rear side 13 of the game board 11 to correspond with the light 28 viewed from the front of the board, and the bulb 46 is disposed in a similar manner to correspond with the light 27. An ordinary flashlight battery 49 is used as the supply voltage 47. In addition to the basic circuit 43, a switch 51 is provided to turn supply 47 on and off. Preferably, the switch 51 is of the type which may be operated by the push button 26 on the front side of the game board. The connecting wires 41 and 42 are coupled to a pair of terminals 52 and 53 which extend through to the rear side of the game board, each of the terminals 52 and 53 then being respectively coupled by wires 54 and 56 to opposite sides of the bulb 44.

It should be noted now that when the switch 51 is turned on only bulb 44 glows, indicating a "wrong" answer by light 28. If however a direct connection is made between terminals 52 and 53 the bulb 44 is short circuited and the bulb 46 lights to indicate a "right" answer on light 27. Now, by directly connecting each question socket 22 in the column 19 to the corresponding answer socket 22 in column 21, the terminals 52 and 53 can be directly connected by inserting the plugs 23 and 24 into corresponding question and answer sockets. Thus when the correct answer is selected, the bulb 44 is shorted out, and upon turning on switch 51 the "right" light 27 will glow.

The foregoing result can be achieved simply by connecting a wire directly between each pair of corresponding question and answer sockets. However, keeping in mind the object of interchanging sets of questions and answers, note that the player is likely to observe that he can find the correct answer by correlating from past experience the positions of corresponding question and answer sockets. As a result, the game loses its value after having been played a few times, and interchanging different sets of questions and answers would not properly stimulate the player.

Figure 5:
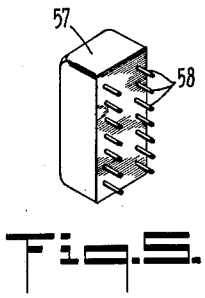
FIGURE 5 is a perspective view of a multi-terminal plug which is removably engaged into the rear side of the game board.
Figure 6:
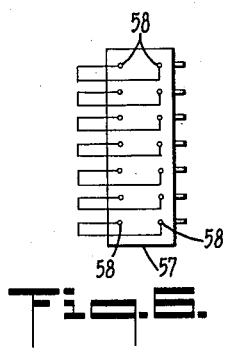
FIGURE 6 shows a partially schematic diagram of one particular wiring arrangement for the plug shown in FIGURE 5.
Figure 7:
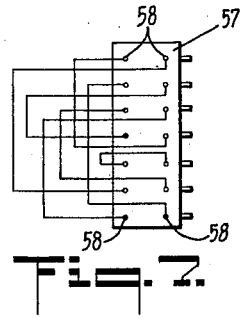
FIGURE 7 illustrates an alternative wiring arrangement for plug shown in FIGURE 5.

In order to condition the player for each new set of questions and answers it is necessary to be able to change the positions of corresponding question and answer sockets with relation to the game board. To achieve this result, the invention provides a multi-terminal socket 54 which is preferably secured to the rear side 13 of the game board. Each of the sockets 22 in both columns 19 and 21 are connected to one of the teminals 56 in the socket 54. A multi-terminal plug 57, shown in FIGURES 5, 6 and 7, is then provided to engage the socket 54, with each terminal 58 of the plug 57 connecting with a terminal 56 of the socket 54. By connecting together pairs of terminals 58 in the plug 57, a direct connection can be made between pairs of question and answer sockets 22. For example, the connection of the plug terminals 58 shown in FIGURE 6 would result in the top socket of the question column 19 being directly connected to the top socket in the answer column 21. Similarly, the second sockets of the question and answer column are also directly connected, and likewise down the columns. FIGURE 7 illustrates another possible connection of the pairs of terminals in the plug 57 which yields a new orientation of corresponding question and answer sockets 22. Thus, for each set of question and answer cards 14 and 16, there is provided an individual plug 57, the plug being properly wired to connect corresponding questions and answers of the particular set. Note that the connections within plug 57 may be made by conventional wiring or by a printed circuit.

To operate the instant game, a set of questions and answer cards along with the corresponding multi-terminal plug are each inserted into the game board. The player then selects a question with one of the plugs mounted on the front of the board, and attempts to match the correct answer to the selected question with the second plug. The push button is then depressed whereupon one of the lights will indicate whether or not the answer is correct.

It will be appreciated that many different types of questions and answers can be inserted on the cards. For example, the question card can list a number of states and the answer card can list the capitols of those states, or one card can have a set of English words and the other card corresponding foreign words. Note also that the number of questions and answers is limited only by the size of the game board, and that the embodiment shown in the drawings having only seven questions is by way of illustration only.

What is claimed is:

1. A question and answer game comprising, in combination, a game board having front and rear sides, means provided on said front side defining two spaced slots and a central panel intermediate said slots, a question card removably retained in one of said slots, an answer card removably retained in the other of said slots, said question card having a plurality of spaced symbols on the exposed face thereof with each said symbol denoting a question, said answer card having a plurality of spaced answer symbols on the exposed face thereof with each said answer symbol denoting an answer to one of said questions, a first plurality of spaced sockets disposed on said board adjacent said question card with said sockets each oriented adjacent one of said question symbols, a second plurality of spaced sockets disposed on said board adjacent said answer card with each socket of said second plurality being positioned adjacent one of said answer symbols, a connector secured to the rear side of said board having a plurality of terminals, each electrically coupled to one of said sockets, means engaging said connector for changeably coupling each of said first plurality of sockets directly to one of said second plurality of sockets in correspondence with a particular pair of question and answer cards, a pair of bulbs secured to said board and visible from the front side thereof, question probe means secured to said board and electrically engageable with said first plurality of sockets, answer probe means secured to said board and electrically engageable with said second plurality of sockets, and circuit means coupled to said bulbs and probes for illuminating one of said bulbs when said probes are connected to corresponding question and answer sockets and for illuminating the other said bulb when said probes are connected to non-corresponding question and answer sockets.

2. A question and answer game comprising, in combination, a game board adapted to exhibit a plurality of questions and answers with each answer corresponding to one of the questions, a plurality of electrical question and answer sockets each disposed on said board and adapted to be disposed respectively adjacent one of the questions and answers, first multi-terminal connector means mounted on said board and having each terminal thereof coupled to one of said sockets, second means coupled with said first means and adapted for directly connecting pairs of corresponding question and answer sockets, an electric contact element adapted to engage said question sockets, a second electric contact element adapted to engage said answer sockets, and circuit means coupled to said contact elements for indicating when said elements are engaging corresponding question and answer sockets.

3. A question and answer game comprising, in combination, a game board adapted to exhibit a plurality of questions and answers with each answer corresponding to one of the questions, a pulrality of electrical question and answer sockets each disposed on said board and adapted to be respectively disposed adjacent one of the questions and answers, a first multi-terminal connector secured to said board and having each terminal thereof electrically coupled to one of said question and answer sockets, a second multi-terminal connector removably engaged in said first connector with the various terminals of said second connector being electrically connected in pairs to form direct electrical connections from each question socket to one answer socket, a pair of incandescent bulbs secured to said board with the first of said bulbs having a substantially larger resistance than the second said bulb, electrical switching means secured to said board, voltage supply means coupled in series with said bulbs and switching means, an electric plug coupled to one side of said first bulb and adapted to engage said question sockets, and a second electric plug coupled to the other side of said first bulb and adapted to engage said answer sockets.

4. A question and answer game comprising, in combination, a generally rectangular game board having front and rear sides, said front side including two elongated ridges disposed respectively adjacent the longer edges of said board, said front side further including a central panel intermediate said ridges defining two elongated spaces between said ridges and central panel, an elongated question card removably retained in one of said spaces on the front of said board, an elongated answer card removably retained in the other of said spaces, said question card having a plurality of longitiudinally spaced apart symbols on the exposed face thereof with each said symbol denoting a question, said answer card having a plurality of longitudinally spaced apart answer symbols on the exposed face thereof with each said answer symbol denoting an answer to one of said questions, a first column of longitudinally spaced apart sockets disposed along said central panel adjacent one edge thereof nearest said question card with said sockets each oriented substantially laterally adjacent one of said questions symbols, a second column of longitudinally spaced apart sockets disposed along said central panel adjacent the other edge thereof with said sockets each oriented substantially laterally adjacent one of said answer symbols, a multi-terminal socket secured to the rear side of said board having each terminal thereof electrically coupled to one of said sockets disposed along said central panel, a multi-terminal plug removably engaged in said multi-terminal socket with the various terminals of said plug being electrically connected in pairs to form direct connections from each socket in said first column to one socket in said second column, a pair of incandescent bulbs secured to said board and visible from said central panel with the first of said bulbs having a substantially larger resistance than the second said bulb, a push button electric switch secured to said board and accessible from said central panel, voltage supply means coupled in series with said two bulbs and push button switch, a first connecting wire secured adjacent one end thereof to said central panel and electrically coupled to one side of said first bulb, a test plug electrically coupled to the other end of said wire and adapted to electrically engage the sockets in said first column, a second connecting wire secured adjacent one end thereof to said central panel and electrically coupled to the other side of said first bulb, and a second test plug electrically coupled to the other end of said second connecting wire and adapted to engage the sockets in said second column.

5. In a question and answer game having a playing board exhibiting a changeable set of questions, a changeable set of answers, and a plurality of electrical sockets respectively adjacent the questions and answers, means for directly coupling each of the question sockets to the proper answer sockets while permitting the positions of the corresponding questions and answers to be changed with respect to said playing board with each different set of questions and answers comprising, in combination, a first multi-terminal connector having each of its terminals connected respectively to one of the various question and answer sockets, and a plurality of second multi-terminal connectors each interchangeably engageable with said first connector, each said second connector having its terminals connected together in pairs which said pairs of terminals each couple to the proper pair of first connector terminals when the second connector is engaged in said first connector thereby directly connecting the proper pairs of sockets for a given set of questions and answers.

References Cited in the file of this patent
UNITED STATES PATENTS

| | | |
|---|---|---|
| 976,287 | Phelps | Nov. 22, 1910 |
| 2,541,172 | Milman | Feb. 13, 1951 |
| 2,697,882 | Gruot | Dec. 28, 1954 |